United States Patent [19]

Idzutsu et al.

[11] 4,058,376

[45] Nov. 15, 1977

[54] GAS ABSORBTION PROCESS

[75] Inventors: Waichiro Idzutsu, Yokohama; Masaaki Kuroki; Shigeru Komukai, both of Kawasaki; Daijiro Terasaki, Tokyo; Sachie Nakajima, Kawasaki, all of Japan

[73] Assignee: Tokyo Gas Co., Ltd., Tokyo, Japan

[21] Appl. No.: 751,092

[22] Filed: Dec. 16, 1976

Related U.S. Application Data

[63] Continuation-in-part of Ser. No. 651,152, Jan. 21, 1976, abandoned.

[51] Int. Cl.$^2$ ............................................. B01D 19/00
[52] U.S. Cl. ......................................... 55/70; 55/68; 55/73
[58] Field of Search ............................ 55/70, 68, 73

[56] References Cited

U.S. PATENT DOCUMENTS

| 3,104,959 | 9/1963 | Grosskinsky et al. | 55/70 |
| 3,335,071 | 8/1967 | Bollen et al. | 55/70 |
| 3,365,374 | 1/1968 | Short et al. | 55/70 |
| 3,880,617 | 4/1975 | Shibuya et al. | 55/68 |

*Primary Examiner*—Bernard Nozick
*Attorney, Agent, or Firm*—Carroll F. Palmer

[57] ABSTRACT

A gas purification process with a dilute ammonia solution wherein gaseous ammonia is incorporated in coal gas, producer gas, water gas, oil gas or the like in an amount of at least one mole per mole of the sum of hydrogen cyanide and hydrogen sulfide contained in said gas, and the resulting gas is contacted in a counter-current manner with an absorbing solution having an ammonia concentration not exceeding 7 g/l to thereby absorb hydrogen cyanide in said absorbing solution.

6 Claims, 1 Drawing Figure

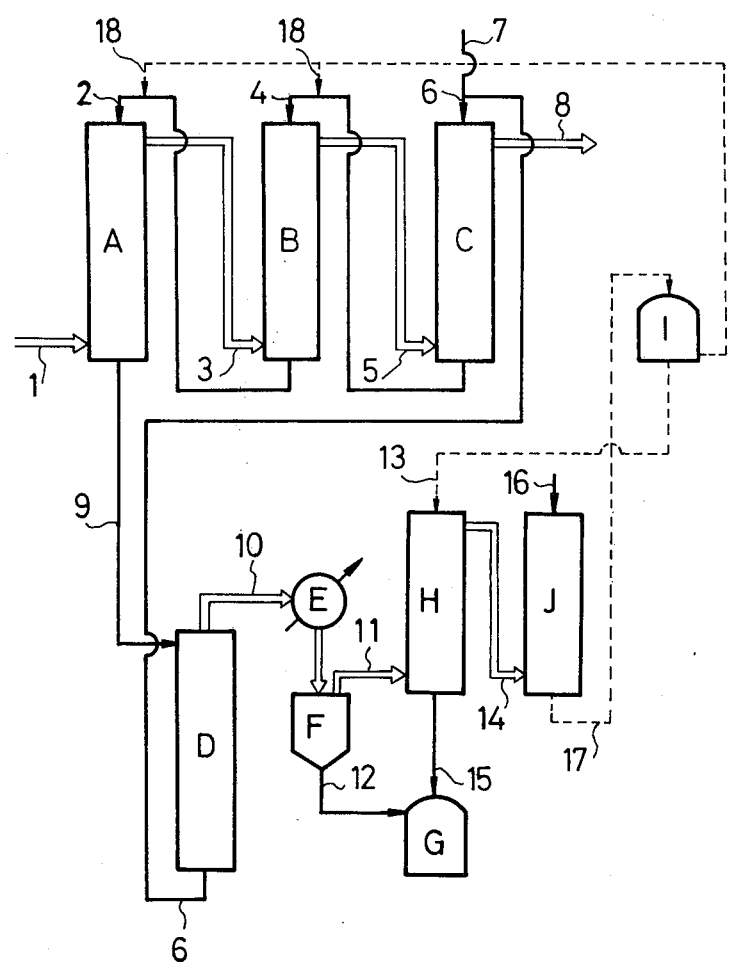

GAS ABSORBTION PROCESS

This application is a continuation-in-part of Ser. No. 651,152 filed Jan. 21, 1976 now abandoned.

This invention relates to an improved gas purification process with a dilute ammonia solution according to which hydrogen cyanide is separated and completely removed from fuel gas or waste gas.

More particularly, the invention relates to a gas purification process with a dilute ammonia solution according to which gaseous ammonia is added or supplied to a gas to be purified in an amount corresponding to the sum of hydrogen cyanide and hydrogen sulfide contained in the gas. The resulting gas is then washed with an absorbing solution.

A gas desulfurization process comprising washing coal gas or the like with an aqueous solution of ammonia as an effective alkali source to thereby remove hydrogen sulfide and the like from the gas has been known for some time.

In conventional processes, however, ammonia absorbing solutions having a very high concentration are used. For example, in the Otto circulation process, an aqueous solution of ammonia having a concentration of 30 to 50 g/l is used under atmospheric pressure and in the Collin-Saar process, an aqueous solution of ammonia having a concentration of 10 to 20 g/l is used under atmospheric pressure. Further, in the Cyclopur process, a high concentration aqueous solution of ammonia is used under a high pressure of 8 to 10 Kg/cm$^2$.

In these conventional processes, since a high concentration aqueous solution of ammonia is used, carbon dioxide contained in a gas to be purified of this type is simultaneously absorbed in a large amount and hence, the capacity of the absorbing solution for absorbing acidic pollutants such as hydrogen sulfide is degraded and it is difficult to maintain the purification efficiency at a high level continuously for a long time.

In each of these conventional processes, in order to maintain such high purification efficiency, it is necessary to increase the amount of the absorbing solution used for a unit of time, and therefore, it is necessary to provide an absorbing column of a large scale and an absorbing solution-regenerator of a large scale. Further, maintenance expenses for transportation of the absorbing solution and supply of steam for regeneration are increased. Accordingly, these conventional processes are economically disadvantageous.

Still further, corrosion of equipment by a highly concentrated ammonia absorbing solution used is extreme, and since large quantities of ammonium carbonate, ammonium hydrogen carbonate and ammonium carbamate are precipitated in the absorbing solution used for the washing treatment, such troubles as clogging or jamming are often caused in the circulation system and the operation maintenance involves difficulties.

What is emphasized is that in these conventional processes, removal of hydrogen cyanide which is a pollutant more harmful than hydrogen sulfide is hardly taken into consideration, and when these conventional processes are applied to purification of a city gas, it is necessary to provide separately a cyanide-removing step.

In view of the foregoing, it has been considered that a gas purification process using an ammonia absorbing solution is defective, and this purification process is now almost out of use. Instead, processes using other alkali sources have been developed, and since around 1960, wet gas purification processes using an oxidizing agent have been mainly adopted in the art.

In these recently developed processes, indeed, the purification efficiency can be improved. However, wet neutralization processes using an alkali source other than ammonia, for example, sodium hydroxide or potassium hydroxide, are defective in that since carbon dioxide contained in a gas to be purified is readily reacted with such alkali component to reduce the washing efficiency of the absorbing solution, it is necessary to withdraw a part of the absorbing solution perpetually and supply a fresh alkali component or to add a step of regenerating the alkali component by decomposing the reaction product between the alkali and carbon dioxide. Further, in the latter processes using an oxidizing agent, a higher purification effect than attainable in the former wet neutralization processes can be attained, but in order to maintain the purification efficiency at a high level continuously for a long period of time, it is necessary to prevent the reduction of the capacity of the absorbing solution by thiocyanates and thiosulfates gradually accumulated in the absorbing solution by withdrawing a part of the absorbing solution from the circulation system and supplying a fresh alkali source as in the former wet neutralization processes. Further, since the so withdrawn absorbing solution has a very high COD value, it must be treated before discharge, and it is difficult to select a proper technique for this treatment and great expenses are required for this treatment.

We have continued through many years research work on gas purification, and during the course of the research it was found that use of a dilute aqueous solution of ammonia heretofore not disclosed in the conventional techniques is very effective for removal of hydrogen cyanide and that in practising this purification process it is an indispensable requirement that gaseous ammonia should be made present in a gas to be purified in an amount corresponding to the sum of hydrogen cyanide and hydrogen sulfide contained in the gas. It was also found that according to this process, hydrogen cyanide contained in a gas to be purified, removal of which is hardly considered in the conventional techniques, can be removed completely in substantial amounts. Based on these findings, we have now perfected this invention.

It is therefore a primary object of this invention to provide a gas purification process with a dilute ammonia solution, according to which hydrogen cyanide contained in a gas can be removed in substantial amounts. In accordance with this invention, this object can be attained by a process comprising incorporating into a gas to be purified gaseous ammonia in an amount of at least 1 mole per mole of the sum of hydrogen cyanide and hydrogen sulfide contained in the gas and contacting the gaseous ammonia-incorporated gas in a counter-current manner with an absorbing solution containing ammonia at a concentration not exceeding 7 g/l to thereby absorb hydrogen cyanide in the absorbing solution.

The gas purification process of this invention with a dilute ammonia solution is generally practised in a customary column type purification apparatus in which absorbing solution is sprinkled from the top of an absorbing column or a gas to be purified is fed from the bottom of the absorbing column to effect counter-current contact. However, the process of this invention is not limited to this column system.

An embodiment of the purification process of this invention will first be described, and then, the gas to be purified, the absorbing solution, hydrogen cyanide and other process factors will be described by referring to the accompanying flow chart.

A gas to be purified 1 from which water-insoluble substances such as tar and naphthalene have been removed in advance and in which a prescribed amount of gaseous ammonia has been incorporated is introduced into an absorbing column A and washed with an absorbing solution 2 flown down from the top of the column A, whereby hydrogen cyanide contained in the gas is absorbed and removed completely in substantial amounts.

The gas 3 coming from the absorbing column A is introduced into an absorbing column B if necessary so as to further improve the purification efficiency, and in this column B, the gas is washed with an absorbing solution 4 having an ammonia concentration lower than that of the absorbing solution used in the absorbing column A. The gas 5 coming from the absorbing column B is introduced into an absorbing column C and washed with an absorbing solution 6 introduced from a regenerator D, into which water 7 is replenished so as to compensate for the loss of water consumed during circulation in the system, and it is fed as a purified gas 8 to a gas tank (not shown).

The absorbing solution 9 which has passed through one or a plurality of the absorbing columns and which contains hydrogen cyanide, hydrogen sulfide, ammonia and the like absorbed therein is introduced into the regenerator D and is regenerated under heating.

The regenerated absorbing solution 6 from which acidic gas components have been removed completely in substantial amounts and which is now a dilute ammonia solution is then circulated through the absorbing columns and recycled to the regenerator D.

The hydrogen cyanide-, hydrogen sulfide- and ammonia-containing gas 10 discharged from the regenerator D is subjected to equilibrium condensation in a condenser E and is separated into a vapor 11 and condensed water 12 in a gas-liquid separator F. The condensed water 12 is charged in a drain tank G and treated appropriately.

Since major portions of harmful components, namely hydrogen cyanide and hydrogen sulfide, are readily dissolved in the condensed water, the vapor 11 is recovered as a substantially pure ammonia gas. The vapor 11 is introduced into a washing column H and washed with aqueous ammonia 13 supplied from a tank I to form a high purity ammonia gas 14. The washing solution 15 is received in the drain tank G and treated appropriately. The ammonia gas 14 is introduced into an ammonia recovery column J to form aqueous ammonia 17, which is stored in the above ammonia storage tank I.

The aqueous ammonia 17 can be used not only as the washing solution 13 in the washing column H but also as a solution 18 for adjusting the ammonia concentration in the absorbing solution.

The principle of the process of this invention will now be described.

In the illustration given hereinafter, for convenience's sake, the contact between the gas and absorbing solution held in the vicinity of the lower portion of the first absorbing column is called "the first stage contact" and the contact between the gas and absorbing solution held in the vicinity of the upper portion of the first absorbing column and in the second and subsequent absorbing columns is referred to as "the second stage contact", though there is not a definite distinction between them.

In the process of this invention, the manner of removing hydrogen cyanide is different between said first stage contact and second stage contact. More specifically, by the first stage contact, the greater portions of the ammonia contained in the gas is absorbed in the absorbing solution sprinkled from the top of the absorbing column to form an aqueous solution of ammonia having a high ammonia concentration, and the major portions of hydrogen cyanide are absorbed in the so formed highly concentrated aqueous ammonia. Then, the gas rises in the absorbing column, and by the second stage contact, the remaining hydrogen cyanide is absorbed in the absorbing solution.

This characteristic process of this invention is substantially different from the conventional gas purification process using a high concentration ammonia absorbing solution. In the conventional technique, the gas is contacted with a high concentration aqueous solution of ammonia throughout the first stage contact and second stage contact referred to in this invention, and therefore, reaction between ammonia and carbon dioxide is accelerated. In contrast, according to the process of this invention, although a reaction zone of an absorbing solution having an ammonia concentration necessary for removal of hydrogen cyanide is provided, the contact between the high concentration aqueous ammonia and the gas is completed in such a short time as will not advance the reaction between the high concentration aqueous ammonia and carbon dioxide. In other words, in the process of this invention, the contact between the high concentration aqueous ammonia and carbon dioxide is allowed only in a very limited region of the first stage contact. In the zone of the second stage contact, the gas passes through a dilute ammonia absorbing solution having such a low ammonia concentration as will no longer cause the reaction between carbon dioxide and ammonia.

In general, the following reactions are caused between carbon dioxide and aqueous ammonia in a gas:

$$CO_2 \text{ (gas)} \rightleftarrows CO_2 \text{ (aqueous solution)} \tag{1}$$

$$CO_2 \text{ (aqueous solution)} + H_2O \rightleftarrows H_2CO_3 \rightleftarrows H^+ + HCO_3^- \tag{2}$$

$$HCO_3^- \rightleftarrows H^+ + CO_3^{--} \tag{3}$$

$$NH_4^+ + HCO_3^- \rightleftarrows NH_4HCO_3 \tag{4}$$

$$2NH_4^+ + CO_3^{--} \rightleftarrows (NH_4)_2CO_3 \tag{5}$$

$$(NH_4)_2CO_3 \rightleftarrows NH_2COONH_4 + H_2O \tag{6}$$

Among the foregoing reactions, although the reactions (4) to (6) are allowed to advance only slightly in an aqueous solution of a low ammonia concentration, they become vigorous as the ammonia concentration is increased, resulting in formation of ammonium carbamate ($NH_2COONH_4$), ammonium hydrogen-carbonate ($NH_4HCO_3$) or ammonium carbonate (($NH_4)_2CO_3$). Further, as the concentration of such reaction product is increased in the aqueous solution, the rate of absorbing hydrogencyanide in the aqueous ammonia solution is drastically lowered. This fact was confirmed according to the results of the following experiment.

Namely, a coal gas (having an average composition of 9.5 g/Nm³ of NH₃, 3.2 g/Nm³ of H₂S, 0.85 g/Nm³ of HCN and 2.0% of CO₂) was washed with an aqueous ammonia solution having an ammonia concentration given below for a contact time of 20 seconds at a liquid/gas ratio of about 10 (1/m³) by using an absorbing column of a diameter of 10 cm and a height of 1 m (packed with Raschigrings of a size of 10 mm × 10 mm × 1.5 mm at a pack height of 50 cm). Results obtained are as shown in Table 1 given below.

Table 1

| NH₃ Concentration (g/l) | HCN Removal Rate (%) | CO₂ Reduction Rate (%) |
|---|---|---|
| 1.0 | 87.2 | 2.2 |
| 2.5 | 88.0 | 4.5 |
| 6.5 | 87.3 | 7.2 |
| 8.5 | 80.2 | 35.7 |
| 20.5 | 78.0 | 75.1 |
| 37.0 | 70.5 | 80.5 |

From the results shown in Table 1, it will readily be understood that in an aqueous ammonia solution having an ammonia concentration higher than 7 g/l, CO₂ in the gas reacts with NH₃ to form NH₂COONH₄, NH₄HCO₃ or (NH₄)₂CO₃ according to the reaction as shown above, and the amount of CO₂ is drastically reduced and the HCN removal rate lowered.

The following reactions are caused between hydrogen cyanide and aqueous ammonia:

 (7)

 (8)

 (9)

In the foregoing reaction formulae, although the dissociation velocity of the reaction [II] is influenced by such conditions as the temperature and the pH value, since the reactions (7) and (9) are advanced very speedily, the dissociation [II] supplying CN⁻ which is consumed by the reaction (9) is promoted and further, dissolution of the gas into the aqueous solution expressed by [I] in the reaction (8) is promoted.

Under conditions where ammonia in the reaction formula (7) is successively supplied, the foregoing reactions are promptly advanced toward the right side.

When the above-mentioned reaction between carbon dioxide and ammonia is compared with this reaction between hydrogencyanide and ammonia, there are observed the following differences concerning the reaction velocity: (i) the velocity of the reaction (2) where carbon dioxide is dissolved in water to form carbonic acid is much lower than the velocity of the reactions (8) and (9), (ii) the velocity of the reaction (6) of forming ammonium carbamate is low and (iii) even when the partial pressure of carbon dioxide is considerably higher than the partial pressures of hydrogen cyanide, the transfer coefficient of carbon dioxide into aqueous ammonia is much smaller than the transfer coefficient of hydrogen cyanide into aqueous ammonia. In view of the foregoing facts (i) to (iii), it is seen that if the time for contact of carbon dioxide with ammonia is shortened as much as possible, it will be possible to make hydrogen cyanide absorbed in aqueous ammonia while inhibiting absorption of carbon dioxide as much as possible.

In the process of this invention, since the contact time at the first stage contact is very short, before the reactions (1) to (6) substantially proceed, the reactions (7) and (8) are caused to advance promptly, and a gas to be purified from which incorporated gaseous ammonia has been released and the major portions of hydrogen cyanide removed is allowed to fall in the second stage contact with a dilute aqueous solution of ammonia sprinkled from the top of the absorbing column. Accordingly, no degradation of the absorbing solution owing to carbon dioxide in the gas is caused, and removal of hydrogen cyanide can be accomplished assuredly.

Theoretically, the amount of gaseous ammonia to be incorporated in a gas to be purified may be 1 mole per mole of the sum of hydrogen cyanide and hydrogen sulfide contained in the gas, but in view of the ammonia-absorbing efficiency of the absorbing solution, it is practically preferred that gaseous ammonia be incorporated in an amount of 2 to 8 moles per mole of the sum of hydrogen cyanide and hydrogen sulfide. From the economical viewpoint, it is not advantageous to supply gaseous ammonia in an amount too excessive over the amounts of hydrogen cyanide and hydrogen sulfide.

Theoretically, the absorbing solution should contain ammonia in an amount of 1 mole per mole of the sum of hydrogen cyanide and hydrogen sulfide left in the gas at the second stage contact. Therefore, if hydrogen cyanide is removed completely in substantial amounts by the first stage contact, the absorbing solution need not contain any ammonia at all. However, in practice, hydrogen cyanide is left in the gas after the first stage contact and they should be removed by the absorbing solution at the second stage contact. Therefore, the absorbing solution having an ammonia concentration not exceeding 7 g/l is used in the process of this invention, and a preferred ammonia concentration of the absorbing solution is within a range of from 0.01 g/l to 1 g/l.

As other conditions to be taken into consideration in practising the process of this invention, there can be mentioned the temperature of the absorbing solution, the pressure in the absorbing column, the liquid/gas ratio and the like. Absorption of hydrogen cyanide in the absorbing solution is advantageously performed at low temperatures, but in the case of absorption accompanied by chemical reactions and influenced by the gas film resistance, higher temperatures are preferred. In view of the foregoing, it is preferred that the absorbing solution be maintained at 10° to 50° C, especially 20° to 30° C. Good results are obtained when the inside of the absorbing column is maintained at atmospheric pressure. The liquid/gas ratio is generally from 2 to 10 and preferably from 3 to 5.

As illustrated hereinabove, the gas purification process of this invention is characterized in that gaseous ammonia is incorporated in a gas to be purified in an amount corresponding to the amounts of hydrogen cyanide and hydrogen sulfide contained in the gas and the gaseous ammonia-incorporated gas is contacted in a counter-current manner with an absorbing solution composed of a dilute aqueous solution of ammonia.

Accordingly, the process of this invention can be applied to purification of not only gases containing ammonia, such as coal gas but also gases which hardly contain ammonia or contain ammonia in a very small amount such as producer gas, thermally cracked oil gas, catalytically cracked oil gas, hydrocracked oil gas and waste gas. In case a gas to be purified does not substantially contain ammonia or contains ammonia in a very small amount, ammonia is added to the gas from the outside of the system and then the gas is introduced into the above-mentioned absorbing column. Thus, hydrogen cyanide in the gas can be removed completely in substantial amounts and the intended object can be attained.

This invention will now be illustrated in detail by reference to the following Examples that by no means limit the scope of the invention.

EXAMPLE 1

$NH_3$ was incorporated in a gas containing 3.8 g/$Nm^3$ of $H_2S$, 1.1 g/$Nm^3$ of HCN and 42 g/$Nm^3$ of $CO_2$ in an amount of 9.2 g/$Nm^3$ (corresponding to about 3.6 mole per mole of the sum of HCN and $H_2S$) and the gas was introduced at a rate of 1000 $Nm^3$/hr from the bottom of an absorbing column of a diameter of 90 cm and a height of 10 m which was packed with TELLERETTES (registered trademark for a plastic packing) to a height of 5 m. An absorbing solution having an $NH_3$ concentration of 0.2 g/l and maintained at 30° C was sprinkled at a rate of 3 ton/hr from the top of the absorbing column. Thus, the gas was washed with the absorbing solution while maintaining the inside of the absorbing column at atmospheric pressure.

In the gas coming from the top of the column, the $H_2S$ and HCN contents were 0.06 g/$Nm^3$ and 0.05 g/$Nm^3$, respectively, and the HCN and $H_2S$ removal rate were 95.4% and 98.4%, respectively. The amount of $CO_2$ was reduced only by 2.1%, and it was confirmed that the consumption of $CO_2$ by reaction with ammonia was very small.

For comparison, the above gas was similarly treated by incorporating $NH_3$ in an amount of 2.1 g/$Nm^3$ (corresponding to 0.8 mole per mole of the sum of HCN and $H_2S$) and without incorporation of $NH_3$. In the former case, the HCN and $H_2S$ removal rate were 70.8% and 60.9%, respectively, and in the latter case, the HCN and $H_2S$ removal rate were 65.2% and 12.5%, respectively.

EXAMPLES 2 to 7

A coal gas as the test gas was introduced at a rate of 1 $m^3$/hr into an experimental small absorbing column having a diameter of 100 mm and packing height of 500 mm and was contacted with an absorbing solution having an ammonia concentration of 0.5 g/l. The contact was carried out while changing the liquid/gas (L/G) ratio (1/$Nm^3$), the temperature of the absorbing solution and the composition of the gas introduced as indicated below. Results obtained are as shown below.

Table 2

| | Example No. | | | | | |
|---|---|---|---|---|---|---|
| | 2 | 3 | 4 | 5 | 6 | 7 |
| L/G (1/$Nm^3$) | 2.0 | 3.0 | 3.0 | 4.0 | 4.0 | 10.0 |
| Temperature (° C) of Absorbing Solution | 50 | 20 | 30 | 30 | 30 | 10 |
| Gas Composition (g/$Nm^3$) | | | | | | |
| $NH_3$ | 8.30 | 8.15 | 8.41 | 18.5 | 21.0 | 8.27 |
| HCN | 0.51 | 0.55 | 0.80 | 1.05 | 1.57 | 0.58 |
| $H_2S$ | 1.92 | 2.03 | 5.10 | 10.3 | 15.1 | 2.05 |
| $CO_2$ | 40.0 | 41.5 | 41.0 | 40.0 | 39.5 | 41.0 |
| $NH_3$/(HCN + $H_2S$) Mole Ratio | 6.6 | 6.1 | 2.7 | 3.2 | 2.5 | 6.1 |
| Removal Rate (%) | | | | | | |
| $NH_3$ | 85.0 | 93.0 | 72.4 | 94.1 | 96.7 | 94.0 |
| HCN | 98.0 | 98.5 | 98.3 | 98.2 | 97.7 | 98.7 |
| $H_2S$ | 98.3 | 99.2 | 99.1 | 98.8 | 98.3 | 99.3 |
| $CO_2$ | 3.0 | 2.4 | 2.1 | 2.0 | 2.0 | 1.9 |

EXAMPLES 8 to 10

A coal gas was introduced at a rate of 1 $m^3$/hr into an absorbing column having a diameter of 100 mm and packing height of 500 mm while adding to the gas $CO_2$ from the outside, and the gas was contacted with an absorbing solution having an ammonia concentration of 0.5 g/l. The contact was carried out at a liquid/gas ratio (L/G) of 3.0 (1/$Nm^3$) and an absorbing solution temperature of 35° C to obtain results shown in Table 3, from which it will readily be understood that the HCN and $H_2S$ removal rate are hardly influenced by the amount of $CO_2$ contained in the gas.

Table 3

| | Example No. | | |
|---|---|---|---|
| | 8 | 9 | 10 |
| Gas Composition (g/$Nm^3$) | | | |
| $NH_3$ | 8.10 | 8.37 | 8.23 |
| HCN | 0.62 | 0.59 | 0.53 |
| $H_2S$ | 2.14 | 2.08 | 1.97 |
| $CO_2$ | 98.3 | 205 | 292 |
| $NH_3$/(HCN + $H_2S$) Mole Ratio | 5.5 | 5.9 | 6.2 |
| Removal Rate (%) | | | |
| HCN | 98.4 | 95.9 | 94.8 |
| $H_2S$ | 99.5 | 97.3 | 96.0 |
| $CO_2$ | 3.0 | 2.3 | 1.8 |

EXAMPLES 11 to 15

Two absorbing columns having a column diameter of 90 cm and a packing height of 500 cm were connected in series. A coal gas was introduced from the bottom of the first column at a rate of 1000 $Nm^3$/hr, and the experiment was conducted while changing the liquid/gas ratio as indicated below. In this experiment, an absorbing solution having an ammonia concentration of 0.2 g/l flowed in one pass from the second column to the first column, and aqueous ammonia having a concentration of 0.3 g/l was replenished from the top of the first column. Obtained results are shown in Table 4, from which it is seen that good results are obtained when the liquid/gas ratio is from 3 to 4 (1/$Nm^3$).

Table 4

| | Example No. | | | | |
|---|---|---|---|---|---|
| | 11 | 12 | 13 | 14 | 15 |
| L/G (1/$Nm^3$) | 2.1 | 3.0 | 4.0 | 3.0 | 5.0 |
| Gas Composition (g/$Nm^3$) | | | | | |
| $NH_3$ | 9.0 | 8.7 | 9.1 | 8.5 | 11.0 |
| HCN | 0.60 | 0.68 | 0.64 | 0.71 | 0.69 |
| $H_2S$ | 1.98 | 3.61 | 2.03 | 3.06 | 5.0 |
| $NH_3$/(HCN + $H_2S$) Mole Ratio | 6.6 | 3.9 | 6.5 | 4.3 | 3.8 |
| Removal Rate (%) | | | | | |
| HCN | 98.1 | 98.3 | 98.6 | 98.1 | 98.0 |
| $H_2S$ | 99.3 | 97.0 | 99.5 | 98.5 | 97.1 |

What we claim is:

1. A gas purification process comprising contacting a gas to be purified containing hydrogen cyanide, ammonia and hydrogen sulfide with an aqueous ammonia absorbing solution to absorb hydrogen cyanide from the gas, said process being characterized in that (1) gaseous ammonia is present in the gas prior to the contact with the absorbing solution, (2) the amount of gaseous ammonia present in the gas is at least 1 mole per mole of the sum of hydrogen cyanide and hydrogen sulfide in the gas, (3) the gas is contacted with the absorbing solution in a counter-current manner, and (4) the ammonia concentration in the absorbing solution is not higher than 7 g/l.

2. A gas purification process according to claim 1 wherein the amount of gaseous ammonia incorporated in the gas is 2 to 8 moles per mole of the sum of hydrogen cyanide and hydrogen sulfide in the gas.

3. A gas purification process according to claim 1 wherein the ammonia concentration in the absorbing solution is 0.01 to 1 g/l.

4. A gas purification process according to claim 1 wherein the temperature of the absorbing solution is 10° to 50° C and the ratio of the absorbing solution to the gas, L/G (1/Nm$^3$), is from 2 to 10.

5. A gas purification process according to claim 1 wherein the counter-current contact is performed by using at least one absorbing column of the type where the absorbing solution is sprinkled from the top of the column and the gas is allowed to rise in the column from the bottom thereof.

6. A gas purification process according to claim 5 wherein the inside pressure of the absorbing column is atmospheric pressure.

* * * * *